(12) United States Patent
Müller et al.

(10) Patent No.: US 11,668,263 B2
(45) Date of Patent: Jun. 6, 2023

(54) PISTON WITH A STRUCTURED DESIGN

(71) Applicant: KS Kolbenschmidt GmbH, Neckarsulm (DE)

(72) Inventors: Gregor Müller, Mannheim (DE); Gerhard Luz, Nordheim (DE); Andreas Berninger, Elsenfeld (DE); Emmerich Ottliczky, Forchtenberg (DE); Matthias Fahr, Neckarsulm (DE)

(73) Assignee: KS Kolbenschmidt GmbH, Neckarsulm (DE)

( * ) Notice: Subject to any disclaimer, the term of this patent is extended or adjusted under 35 U.S.C. 154(b) by 0 days.

(21) Appl. No.: 16/605,521

(22) PCT Filed: Apr. 18, 2018

(86) PCT No.: PCT/EP2018/059875
§ 371 (c)(1),
(2) Date: Oct. 16, 2019

(87) PCT Pub. No.: WO2018/192959
PCT Pub. Date: Oct. 25, 2018

(65) Prior Publication Data
US 2020/0072158 A1 Mar. 5, 2020

(30) Foreign Application Priority Data
Apr. 19, 2017 (DE) .................... 10 2017 108 314.6

(51) Int. Cl.
*F16J 1/02* (2006.01)
*F02F 3/00* (2006.01)
(Continued)

(52) U.S. Cl.
CPC ............ *F02F 3/0076* (2013.01); *B23P 15/10* (2013.01); *F02F 3/22* (2013.01); *F16J 1/02* (2013.01); *F16J 1/04* (2013.01); *F02F 2200/04* (2013.01)

(58) Field of Classification Search
CPC ....... B23P 15/10; F02F 2200/04; F02F 3/003; F02F 3/0076; F02F 3/22; F02F 3/00;
(Continued)

(56) References Cited

U.S. PATENT DOCUMENTS 1,492,590 A * 5/1924 Young .................... F02F 3/027
92/160
1,926,329 A 9/1933 Chilton
(Continued)

FOREIGN PATENT DOCUMENTS

AT 141390 B 4/1935
CN 202348466 U 7/2012
(Continued)

OTHER PUBLICATIONS

JP 03015650 A translation.*

*Primary Examiner* — George C Jin
*Assistant Examiner* — Teuta B Holbrook
(74) *Attorney, Agent, or Firm* — Young Basile Hanlon & MacFarlane, P.C.

(57) ABSTRACT

Piston (1) of an internal combustion engine, which piston is designed in structured construction, comprising two oppositely arranged load-bearing skirt wall portions (2), wherein a connecting wall (3) respectively extends, starting from a pin boss (4), in the direction of the side edge of the load-bearing skirt wall portions (2), characterized in that in an interior of the piston (1) is (are) disposed at least one rib (5, 6, 7), preferably three ribs (5, 6, 7), and the material of the regions around the at least one rib (5, 6, 7) is reduced.

14 Claims, 5 Drawing Sheets

(51) Int. Cl.
*B23P 15/10* (2006.01)
*F02F 3/22* (2006.01)
*F16J 1/04* (2006.01)

(58) Field of Classification Search
CPC .. F02F 3/0015; F02F 3/042; F02F 3/08; F02F 3/225; F16J 1/02; F16J 1/04; Y10T 29/49249; Y10T 29/49252; Y10T 428/12389; B21K 1/185; B21K 1/18
USPC .......... 123/41.35, 193.1, 193.6; 92/172, 174, 92/216; 29/888.04, 888.042, 888.044
See application file for complete search history.

(56) References Cited

U.S. PATENT DOCUMENTS

| | | | | |
|---|---|---|---|---|
| 3,173,345 | A * | 3/1965 | Thompson | F02F 3/0076 92/239 |
| 3,434,398 | A * | 3/1969 | Wilhelm | F02F 3/047 92/228 |
| 4,011,797 | A * | 3/1977 | Cornet | F02F 3/003 92/186 |
| 4,587,932 | A * | 5/1986 | Moebus | F02F 3/0023 123/193.6 |
| 4,662,319 | A * | 5/1987 | Ayoul | F02F 3/22 123/41.35 |
| 4,715,267 | A * | 12/1987 | Richmond | F16J 1/04 92/232 |
| 5,404,792 | A * | 4/1995 | Watanabe | F02F 3/00 123/193.6 |
| 6,240,828 | B1 * | 6/2001 | Fujimoto | F02F 3/02 92/214 |
| 6,318,243 | B1 | 11/2001 | Jones | |
| 6,357,341 | B1 * | 3/2002 | Watanabe | F02F 3/00 123/193.6 |
| 6,435,077 | B1 * | 8/2002 | Damour | F02B 23/0672 92/187 |
| 7,954,421 | B2 | 6/2011 | Buschbeck et al. | |
| 8,662,049 | B2 * | 3/2014 | Nodl | F02F 3/0076 123/193.6 |
| 10,082,101 | B2 * | 9/2018 | Freidhager | F02F 3/22 |
| 10,221,807 | B2 | 3/2019 | Janssen et al. | |
| 10,436,146 | B2 * | 10/2019 | Seiffert | F02F 3/22 |
| 2006/0037471 | A1 * | 2/2006 | Zhu | F02F 3/22 92/173 |
| 2006/0162550 | A1 * | 7/2006 | Schlessmann | F02F 3/02 92/187 |
| 2009/0056534 | A1 * | 3/2009 | Scharp | F02F 3/0076 92/239 |
| 2009/0188464 | A1 | 7/2009 | Dettori et al. | |
| 2010/0258064 | A1 * | 10/2010 | Rebello | F02F 3/003 123/41.35 |
| 2010/0307446 | A1 * | 12/2010 | Nodi | F02F 3/0076 123/193.6 |
| 2011/0197758 | A1 | 8/2011 | Lapp et al. | |
| 2012/0145112 | A1 * | 6/2012 | Scharp | B21K 1/185 123/193.6 |
| 2012/0222305 | A1 * | 9/2012 | Scharp | F02F 3/22 29/888.042 |
| 2013/0008307 | A1 | 1/2013 | Will et al. | |
| 2013/0233270 | A1 * | 9/2013 | Brandt | F02F 3/00 123/193.6 |
| 2014/0083390 | A1 * | 3/2014 | Azevedo | F16J 1/005 123/193.6 |
| 2014/0130767 | A1 * | 5/2014 | Leitl | F02F 3/22 123/193.6 |
| 2014/0261284 | A1 * | 9/2014 | McMurray | F02F 3/003 123/193.6 |
| 2015/0027401 | A1 * | 1/2015 | Gniesmer | F02F 3/0069 123/197.3 |
| 2016/0069294 | A1 | 3/2016 | Kuhnel | |
| 2016/0123274 | A1 * | 5/2016 | Miller | F02F 3/00 123/41.35 |
| 2016/0169150 | A1 * | 6/2016 | Freidhager | F02F 3/22 123/193.6 |
| 2016/0222911 | A1 * | 8/2016 | Salenbien | F02F 3/18 |
| 2016/0281635 | A1 | 9/2016 | Weinenger et al. | |
| 2017/0051703 | A1 | 2/2017 | Lormes et al. | |
| 2017/0363040 | A1 * | 12/2017 | Brown | F16J 1/001 |
| 2018/0156157 | A1 * | 6/2018 | Meske | F02F 3/022 |
| 2018/0230937 | A1 | 8/2018 | Laqua | |
| 2018/0252182 | A1 | 9/2018 | Stier | |
| 2018/0274480 | A1 | 9/2018 | Lormes | |
| 2018/0313293 | A1 | 11/2018 | Laqua | |
| 2018/0326471 | A1 | 11/2018 | Muller | |
| 2018/0335140 | A1 * | 11/2018 | Ichikawa | F02F 3/26 |
| 2019/0224762 | A1 | 7/2019 | Kohler et al. | |

FOREIGN PATENT DOCUMENTS

| | | | |
|---|---|---|---|
| CN | 206409317 U | * 8/2017 | |
| CN | 215370056 U | * 12/2021 | |
| DE | 711937 C | 10/1941 | |
| DE | 1103698 B | 3/1961 | |
| DE | 4005312 A1 | * 8/1990 | |
| DE | 10 2004 031 513 A1 | 1/2006 | |
| DE | 102006013905 A1 | 9/2007 | |
| DE | 102007018932 A1 | 10/2008 | |
| DE | 102011007285 A1 | 10/2012 | |
| DE | 102011085448 A1 | 5/2013 | |
| EP | 0188108 A1 | * 7/1986 | ............. F02F 3/027 |
| EP | 0188108 A1 | 7/1986 | |
| EP | 2085598 A2 | 8/2009 | |
| EP | 2085598 A2 | * 8/2009 | ................ F16J 1/16 |
| JP | S53154907 U | 12/1978 | |
| JP | S5954728 U | 4/1984 | |
| JP | 03015649 A | * 1/1991 | |
| JP | 03015650 A | * 1/1991 | ................ F16J 1/04 |
| JP | H09329057 A | 12/1997 | |
| JP | 2000337212 A | * 12/2000 | |
| JP | 2001289117 A | 10/2001 | |
| JP | 2004270489 A | 9/2004 | |
| JP | 2012136972 A | 7/2012 | |
| KR | 20170030322 A | * 3/2017 | |
| WO | WO-2007025686 A1 | * 3/2007 | ............... F02F 3/00 |
| WO | WO-2009068494 A2 | * 6/2009 | ............. B22F 3/225 |
| WO | 2011035919 A1 | 3/2011 | |
| WO | 2011101141 A1 | 8/2011 | |

* cited by examiner

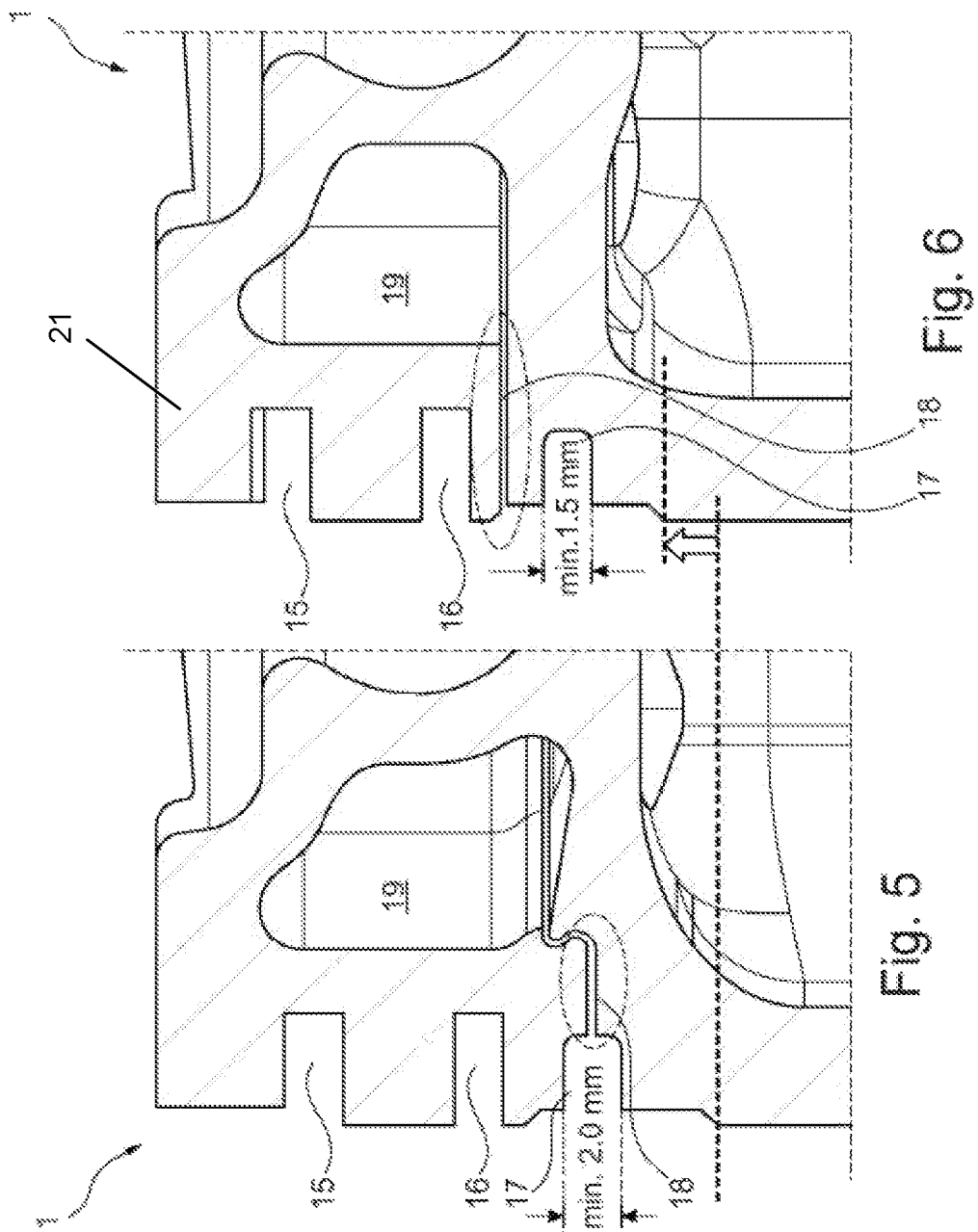

PISTON WITH A STRUCTURED DESIGN

CROSS-REFERENCE TO RELATED APPLICATIONS

This application is a national stage application, filed under 35 U.S.C. § 371, of International Application No. PCT/EP2018/059875, filed Apr. 18, 2018, which claims priority to German Application No. 10 2017 108 314.6, filed Apr. 19, 2017, which are both incorporated by reference in their entirety.

TECHNICAL FIELD

The invention relates to a weight-optimized piston of an internal combustion engine and to a method for producing a weight-optimized piston.

BACKGROUND

In pistons for internal combustion engines, it is always necessary to reconcile the necessary strength and durability and the weight.

In terms of the strength and durability, pistons are produced from forged piston blanks.

A production method is known from DE 10 2004 031 513 A1. In this, a piston blank is forged and a protruding collar is deformed in order thus to obtain the broadly definitive shape of the piston, wherein behind the deformed collar is formed a cavity, which can be used, for instance, as a cooling duct. Following the finishing of the piston blank, in particular by a welding of the free end of the deformed collar to the main body of the piston blank and a finishing to size, the ready-to-use piston is available.

However, the known piston is not yet optimized in terms of its weight, so that it is an aim of the invention to reduce such a piston with respect to its weight any loss of durability or strength.

SUMMARY

The object of the invention is thus to provide a piston which is improved in relation to the known piston, and a corresponding improved method for producing, in particular, a piston of the generic type.

According to the invention, a piston in a so-called structured construction is made available.

The basic concept of producing a piston blank preferredly by forging process is maintained, since this offers the known advantages in terms of strength and durability. During the forging process, a protruding collar is created in a manner which is known per se, deformed, and subsequently the free circumferential end of the deformed collar is integrally connected, for example by welding, to the main body of the piston blank. In the known prior art, the piston has three annular grooves, wherein the joining region lies roughly in the middle of the bottommost annular groove.

The aforementioned structured construction is characterized in that the piston blank is provided in its interior at specific places with ribs and, at the same time, the regions around these ribs are reduced in terms of their wall thickness (in relation to the wall thickness without ribs). The at least one rib, preferably all ribs, in the interior of the piston main body, and thus of the subsequent finished, ready-to-use piston, effect a stiffening of the regions in which they are disposed. At the same time, this stiffening enables the reduction of the material thickness (wall thickness) around the ribs, so that, although, through the provision of the ribs, material is slightly amassed in these places, the weight saving is obtained by virtue of the fact that material around the stiffenings can be reduced to a, in relation thereto, greater extent.

In a refinement of the invention, alternatively or additionally to this structured construction of the piston with stiffenings and simultaneous removal of material around the stiffenings, a recess is provided in the region of the inner pin boss, which recess extends around the upper and lower apex of the pin bore. It has proved that this removal of material not only leads to the desired weight reduction, but also does not compromise the strength or durability of the piston in use in the internal combustion engine.

In a refinement of the invention, it is alternatively or additionally provided that the joining region is placed between the free circumferential end of the deformed collar and the piston main body into the region between the bottommost (third) and the middle (second) annular groove. As a result, the height of the load-bearing skirt wall portions (skirt upper length) can be extended, whereby the noise generation of the piston during operation in the cylinder of the internal combustion engine is reduced. Moreover, it is possible to reduce the height of the bottommost (third) annular groove.

While the above-stated three measures can be applied respectively in isolation, it is of particular advantage if at least the structured construction and the recess in the interior of the pin boss are combined with one another in order to reduce the weight of the finished piston by at least 10% in relation to comparable pistons, while maintaining acceptable operating safety levels.

BRIEF DESCRIPTION OF THE DRAWINGS

FIG. 5 is a partial cross-sectional view of a prior art piston.

FIG. 6 is a partial cross-sectional view of an example of the present invention.

DETAILED DESCRIPTION

An illustrative embodiment by which the structured construction and the recess on the inner side of the pin boss is discernible is shown in FIGS. 1 to 4.

Figure 1:
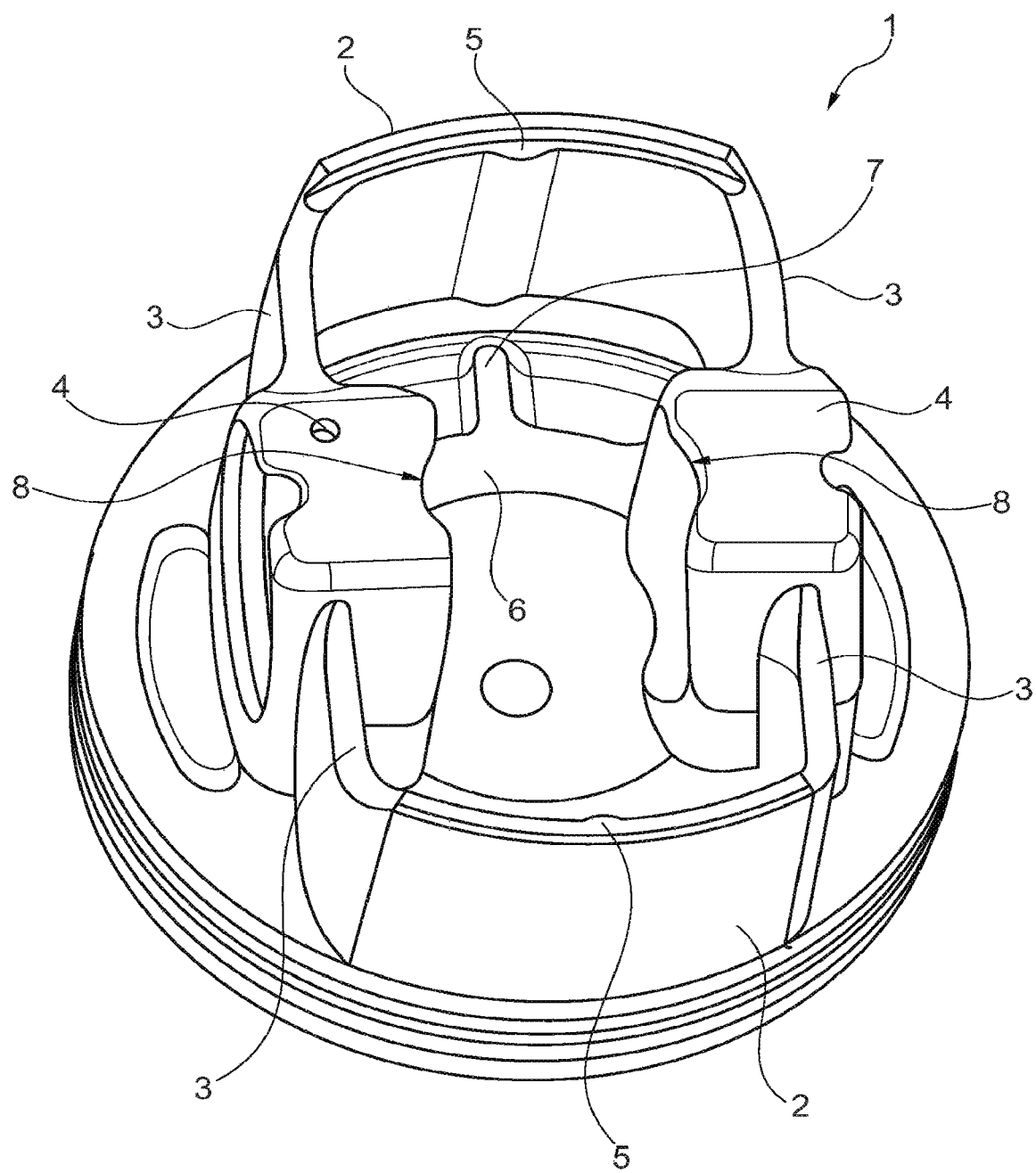
FIG. 1 is a bottom perspective view of one example of the invention.

FIG. 1 shows in a three-dimensional view a piston 1 from below, wherein opposite load-bearing skirt wall portions are denoted by 2 and connecting walls which connect the load-bearing skirt wall portions 2 one to another are denoted by 3. In each case, a connecting wall 3 extends, starting from a pin boss 4, in the direction of the side edge of the load-bearing skirt wall portions 2.

At this point, it should be pointed out that, in the production of this piston 1, the method according to DE 10 2004 031 513 A1 can be applied, but does not have to be applied. Since the piston main body which forms the subsequent finished piston 1 is forged, care should be taken to ensure that the elements involved (such as skirt wall portions 2, connecting walls 3, pin bosses 4 and the like) have the draft angles necessary for the forging operation. Instead of a forging operation, production by a casting operation can also, of course, be considered.

The structured construction of the piston 1 is characterized by at least one rib at a suitable place.

The ribs are constituted by a first rib 5 which is disposed on the inner side of the respective load-bearing skirt wall portion 2, and/or by a second rib 6 which in the interior connects the two pin bosses 4 one to another, and/or by a third rib 7 which runs transversely to a pin bore axis.

Particular preference is given to the combination of ribs 5, 6, 7 as are represented in FIG. 1.

In combination or, where appropriate, also in isolation, the piston 1 can have on the inward facing side of the pin boss 4, around the upper and/or lower apex thereof, respectively a recess 8. As a result of this recess 8, weight savings are made, yet the strength of the pin boss 4 is not compromised.

Figure 2:
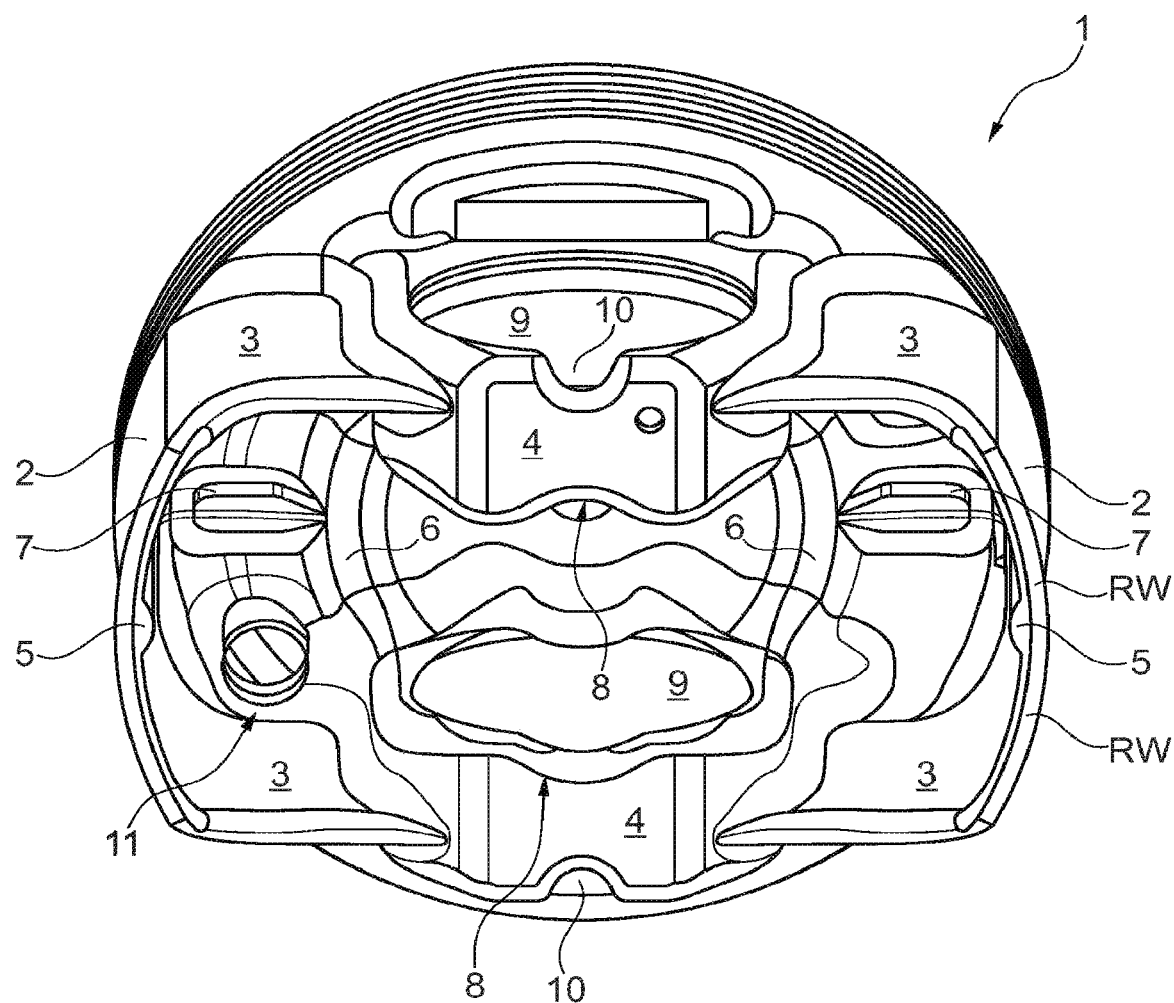
FIG. 2 is an alternate bottom perspective view of FIG. 1.

The above-stated measures are represented in combination also in FIG. 2. In this, in particular the course and arrangement of the first rib 5 and/or of the second rib 6 and/or of the third rib 7 is discernible. In this context, it should be pointed out that it is of particular inventive importance that, in the regions around the ribs 5, 6, 7, the wall thicknesses or the material thickness are reduced. With respect to the load-bearing skirt wall portions 2, it is displayed that, around the rib 5, the load-bearing skirt wall portion 2 has a reduced wall thickness RW.

Figure 3:
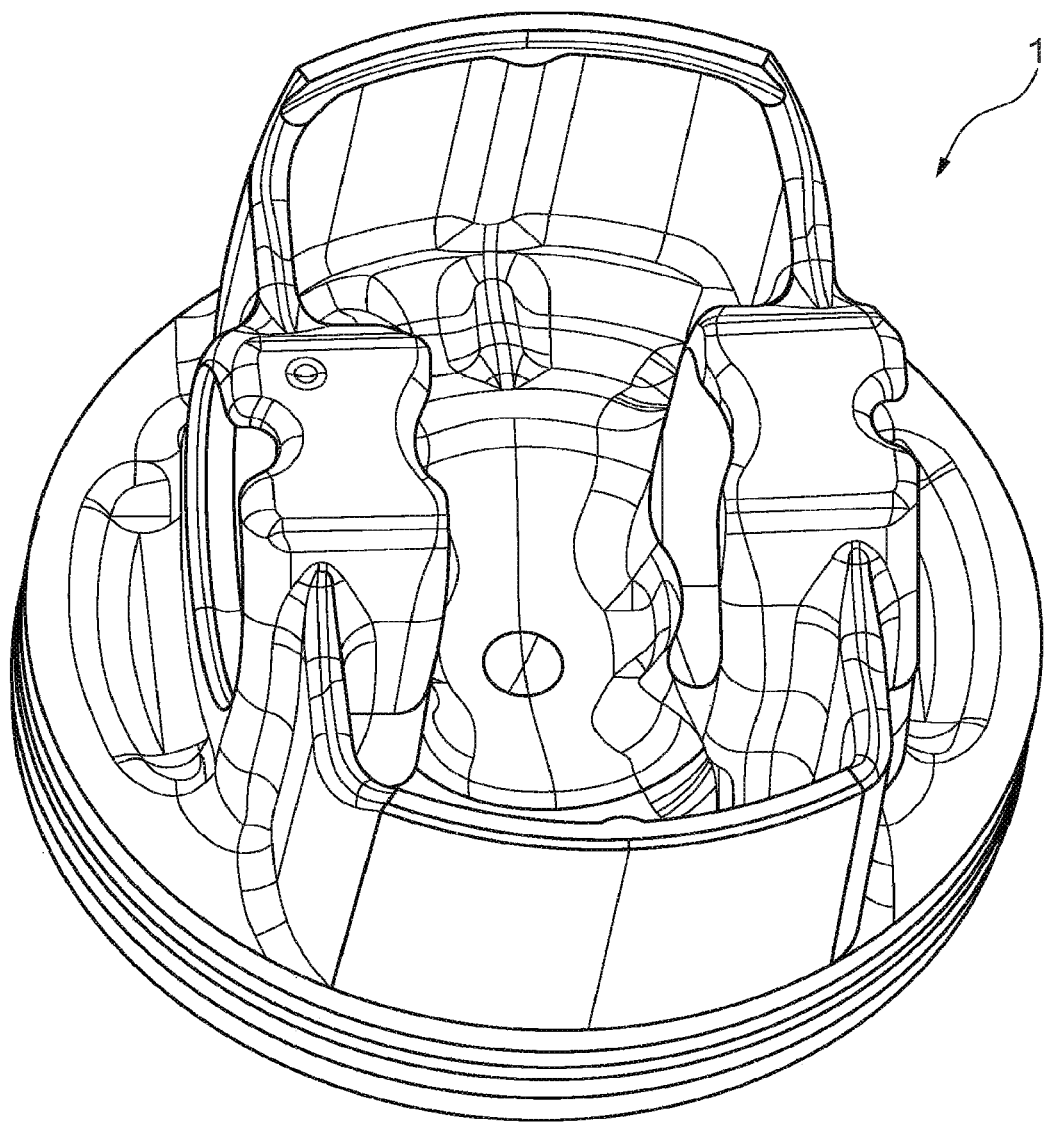
FIG. 3 is an alternate bottom perspective view of FIG. 1.

For further clarification, in FIG. 2 a draft groove is denoted by 10 and an opening for a cooling medium which can be introduced into a cooling duct (not represented here) of the piston, and evacuated therefrom, is denoted by 11. FIG. 3 is based on the piston 1 according to FIG. 1, wherein, in order to clarify the course of the ribs 5, 6, 7 and their transition into regions with reduced wall thickness RW, gridlines are displayed.

Figure 4:
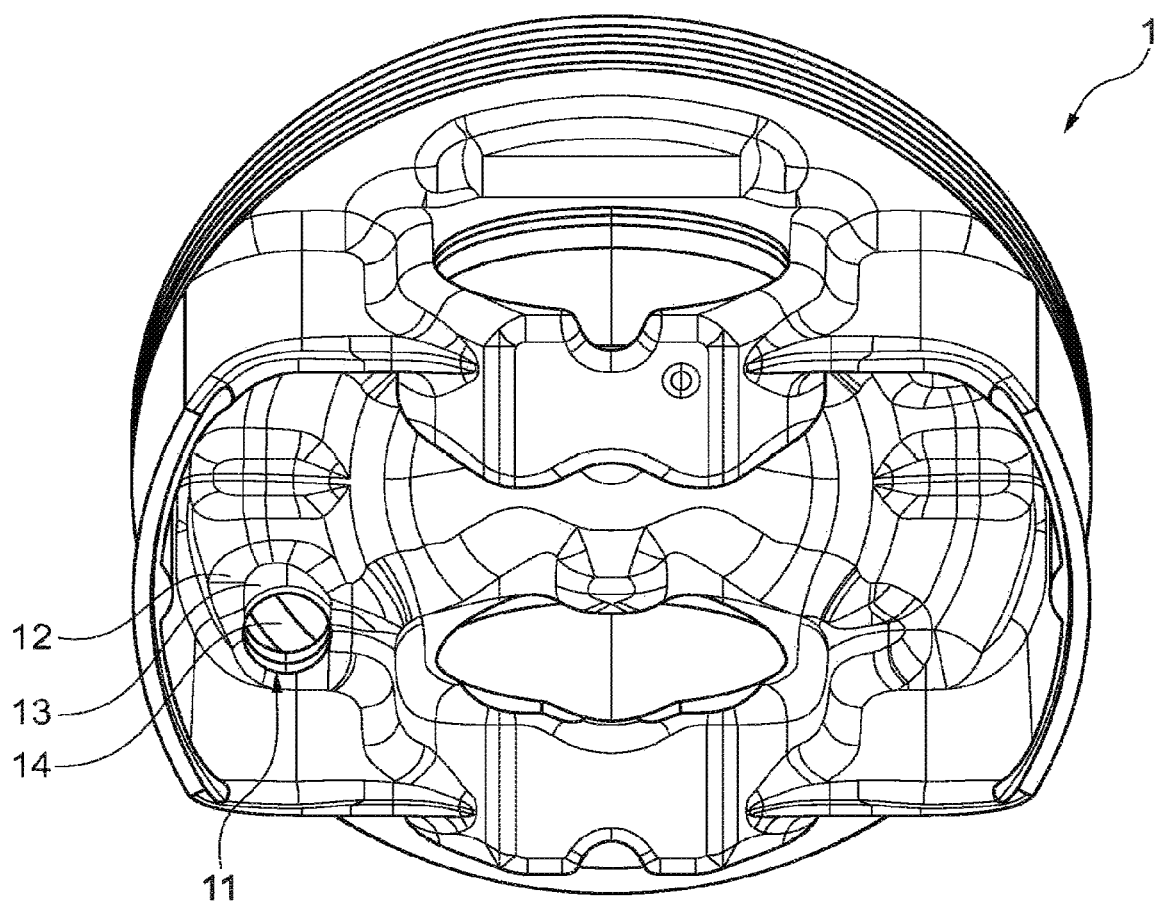
FIG. 4 is an alternate bottom perspective view of FIG. 2.

The same applies to FIG. 4, which is based on the piston 1 according to FIG. 2. Here it is additionally displayed and apparent that around the opening 11 is arranged a circumferential bead 12, wherein in a section around the opening 11, together with a section of the circumferential bead 12, is formed a depression (trough 13). As a result, not only can weight be reduced, but also cooling medium can be collected in the trough 13 when this cooling medium, upon the up and down movement of the piston 1 in the cylinder of the internal combustion engine, is injected into the opening 11 and around this. The circumferential bead 12 thus effects a stiffening, and the trough 13 effects not only a material reduction, but also a storage reservoir for the cooling medium with a view to further improved cooling of the piston 1. By 14 is denoted, within the cooling duct (not represented in detail), a jet splitter, which can be present, but does not have to be present.

While in FIGS. 1 to 4 the two possible measures comprising the structured construction and the recess on the inner side of the pin boss are shown, in FIGS. 5 and 6 the change in terms of the location of the joining region is discernible.

FIG. 5 shows the situation in the case of the piston as is known from DE 10 2004 031 513 Al. This known piston has three annular grooves, first annular groove 15, second annular groove 16, third annular groove 17, wherein the free circumferential marginal region of the deformed collar 21 is integrally connected in a joining region 18 to the main body of the piston blank. This joining region 18 lies in the region of the bottommost (third) annular groove 17.

In contrast hereto, the piston 1 according to the invention as is represented in FIG. 6 is altered to the effect that the joining region 18A has been shifted into the region between the middle (second) annular groove 16 and the bottommost (third) annular groove 17.

By 19 is denoted a cooling duct which runs in an annular course behind the ring field of the piston 1.

REFERENCE SYMBOL LIST 1 piston
2 load-bearing skirt wall portion
3 connecting wall
4 pin boss
5 rib
6 rib
7 rib
8 recess
9 pin bore
10 draft groove
11 opening
12 circumferential bead
13 trough
14 jet splitter
15 annular groove
16 annular groove
17 annular groove
18 joining region
19 cooling duct

What is claimed is:

1. A piston (1) of an internal combustion engine, which piston is designed in structured construction, comprising two oppositely arranged load-bearing skirt wall portions (2) extending downward below a piston main body defining an interior skirt wall height, wherein a connecting wall (3) respectively extends, starting from a respective one of two pin bosses (4), in the direction of a side edge of the load-bearing skirt wall portions (2), characterized in that in an interior of the piston (1) is disposed a first rib (5) disposed on an inner side and at a center of the respective skirt wall portions; a second rib (6); and a third rib (7) positioned in angular alignment with the first rib at the center of the respective skirt wall portion and oriented transversely to a pin bore axis, the third rib (7) positioned radially inward and separate from the skirt wall portions, wherein a material thickness of a region around the second and the third rib is reduced, and wherein the first rib (5) is configured to extend along the interior skirt wall height and including a constant cross-section.

2. The piston (1) of claim 1, wherein the second rib (6) connects the two pin bosses (4) to one another, the second rib (6) positioned radially inward and radially distant from the skirt wall portions (2).

3. The piston (1) of claim 1 wherein an inward facing side of each of the two pin bosses (4) defines a recess (8) positioned and extending around an upper apex and a lower apex of the respective pin bore (9) of the two pin bosses (4).

4. The piston (1) of claim 3, wherein each of the two pin bosses (4) define a draft groove (10) positioned opposite the respective recess (8).

5. The piston (1) of claim 1, characterized in that, around the first rib (5), the load-bearing skirt wall portion (2) has a reduced wall thickness (RW).

6. The piston (1) of claim 1 wherein the piston (1) further defines at least one opening (11) for a cooling medium, wherein around the opening (11) is positioned a circumferential bead (12).

7. The piston (1) of claim 6, characterized in that in a section radially outward of the at least one opening (11), together with a section of the circumferential bead (12), defines a trough (13) operable to collect a portion of the cooling medium.

8. The piston (1) of claim 1 further comprising:
a main body; and
a collar portion connected to the main body, the collar portion having a free circumferential marginal region, the collar defining a first annular groove (15) and a second annular groove (16) positioned below the first annular groove, the main body defining a third annular groove (17) positioned below the second annular groove, wherein the collar circumferential marginal region is connected to the main body at a joining region (18A) positioned between the second and the third annular groove.

9. The piston (1) of claim 1, wherein the first rib (5) extends substantially a full length of the respective interior skirt wall height.

10. A method for producing a piston blank, comprising a main body and skirt wall potions (2) extending downward below the main body defining an interior skirt wall height, in a forging process, wherein, during the forging process, a protruding collar is created, deformed, and subsequently a free circumferential end of the deformed collar is integrally connected to the main body of the piston blank, characterized in that the piston blank is provided in an interior with a first rib (5) positioned at a center of the respective skirt wall portion and having a constant cross-section; a second rib (6); and a third rib (7) positioned in angular alignment with the first rib at the center of the respective skirt wall portion, wherein regions around the first rib (5), the second rib (6), and the third rib (7) are reduced in terms of a wall thickness in relation to the wall thickness without the first rib (5), the second rib (6), and the third rib (7), the third rib oriented transversely to a pin bore axis and positioned radially inward and separate from load-bearing skirt wall portions (2), and wherein the first rib (5) is configured to extend along the interior skirt wall height.

11. The method of claim 10 further comprising forming a recess (8) in a region of an inner facing side of a pin boss (4) defining a pin bore (9), the recess positioned at an upper apex of the pin bore.

12. The method of claim 10, wherein the piston blank further comprises a first annular groove (15) and a second annular groove (16) positioned below the first annular groove, the collar further having a free circumferential marginal region, the main body defining a third annular groove (17) positioned below the second annular groove, the method further comprising joining the collar free circumferential marginal region to the main body at a joining region (18A) positioned between the third annular groove and the second annular groove.

13. The method of claim 12 wherein after the joining of the collar free circumferential marginal region to the main body of the piston blank, the method further comprising finishing to size of the piston blank.

14. The piston (1) of claim 10, wherein the first rib (5) extends substantially a full length of the respective interior skirt wall height.

* * * * *